Jan. 27, 1925.

V. GEPHART
AIRPLANE
Filed July 2, 1921

Valentine Gephart.
INVENTOR.

BY
ATTORNEY

Fig. 14.

Patented Jan. 27, 1925.

1,524,352

UNITED STATES PATENT OFFICE.

VALENTINE GEPHART, OF KANSAS CITY, MISSOURI.

AIRPLANE.

Application filed July 2, 1921. Serial No. 482,020.

*To all whom it may concern:*

Be it known that I, VALENTINE GEPHART, a citizen of the United States of America, and resident of Kansas City, county of Jackson, State of Missouri, have invented certain new and useful Improvements in and Relating to Airplanes, of which the following is a specification.

This invention relates to certain improvements in airplanes; and the nature and objects of the invention will be readily understood by those skilled in the art in the light of the following explanation and detailed description of the accompanying drawings illustrating what I at present believe to be the preferred embodiments or mechanical expressions of my invention from among other forms, arrangements, combinations and constructions within the spirit and scope thereof.

One of the present problems confronting the general acceptance and use of airplanes resides in the necessity, with prevailing types of airplanes, of providing special landing, terminal, storage and parking facilities at considerable distances from cities and other centers of population. This necessity arises from the fact that the present types of airplanes require a comparatively large space to land and take off in, and such tracts of land suitable for this purpose are only available at considerable distances from populated areas, and further due, to the spread of the lifting surfaces or wings of the present airplane types, special facilities for parking and storing must be provided adjacent the landing fields, as the present types are not capable of travel for any considerable distance over the ground or along roads, to and from the landing and terminal fields. Therefore, at present, large, buildings, hangars and the like, must be erected at great expense, adjacent landing and terminal fields, in which to park and store airplanes, and as these fields are by necessity, at considerable distances from cities and other centers of population, the users of airplanes are forced to store the same in the buildings provided adjacent the field and to travel to and from the field at which the planes are stored.

The present invention has for one of its general objects the elimination of the hereinbefore referred to disadvantages at present existing in the use and operation of airplanes, by providing an airplane which is capable of parking or storage in a small space, for example, in automobile garages, and which may be driven under its own power to and from the place of storage and the flying field as a ground vehicle, thus overcoming the necessity for storing or parking the airplane at considerable distances from the locality in which the user lives, and at great expense, in the buildings provided adjacent the flying field; and further doing away with the difficulties and expense of travel to and from the flying field by other means than the airplane.

A further object of this invention is to provide an airplane in which the wings and empennage thereof are mounted in such a manner, that these normally laterally extending surfaces may be collapsed and folded into compact position longitudinally along the fuselage to permit passage of the airplane when traveling on the ground along roadways and the like, and to permit parking or storing the airplane in spaces of a size sufficient to accommodate the fuselage and chassis of the airplane with the wings and empennage in folded position.

It is well known and understood by those familiar with this art that to secure a maximum performance in an airplane the parasite or head resistance must be reduced to a minimum without structurally weakening or reducing the factor of safety of the airplane. This reduction in parasite resistance is usually obtained by eliminating and reducing all exposed exterior elements of the structure and by carefully stream lining the remaining, essential exposed elements. In the present invention, another of the objects thereof is to provide an airplane construction in which the wings and empennage are collapsible and foldably mounted on the fuselage without increasing the parasite resistance by adding exterior exposed elements and without decreasing the factor of safety or strength of the structure due to the collapsible and foldable mounting of the wings and empennage on the fuselage, the strains and stresses to which these surfaces are subjected being carried by and distributed directly to the fuselage and chassis construction through the collapsible and foldable structure by which the wings and empennage are mounted.

The invention has for a further object the provision of an improved construction and arrangement of wing hinge for collapsibly and foldably mounting the wings of an airplane to the fuselage without decreasing the factor of safety by weakening the structure so mounted.

A further object of the invention is to provide an airplane with the wings and empennage thereof, collapsibly and foldably mounted and so constructed and arranged that these surfaces may be completely detached and removed from the fuselage and chassis structure in dissembling the airplane and which may be quickly and readily mounted in proper position and alinement in assembling the airplane without the necessity of employing the services of skilled airplane riggers, the invention providing in effect, self alining wings and empennage.

The invention includes as another one of its objects, the provision of mechanism for propelling an airplane along the ground by power derived from the motor of the airplane and applied to the landing wheels of the chassis, this ground propelling mechanism providing means for steering the airplane when propelled along the ground by the above driving mechanism.

A further object of the invention is the provision of an improved propeller drive gear for releasing the propeller from the motor and rendering the propeller inoperative when the airplane is being driven by the ground propelling mechanism.

With these and various other objects in view, the invention consists in certain novel features in construction and in combinations and arrangements as more fully and particularly set forth and specified hereinafter.

Referring to the accompanying drawings.

This invention is particularly applicable to airplanes of the monoplane type, and the embodiment illustrated herewith discloses the invention applied to an airplane of this type, although it is to be understood that it is not intended or desired to limit the invention to use and combination with the illustrated type, as the invention is applicable to other types and includes a number of features, combinations and constructions which are applicable to and can be used in connection with airplanes of the multiplane type, as will be clearly understood and appreciated by those familiar with and skilled in this art.

In the accompanying drawings, I show by way of example, an airplane of the monoplane type embodying the features of my invention, and comprising the body or fuselage 10, the chassis 20, supporting surfaces or wings 30 and the empennage 40, all of which in a general manner, are arranged and mounted with respect to each other in accordance with the prevailing broad principles of airplane design. In the particular instance of the invention illustrated herewith, the airplane is constructed of metal, for example a metal such as duralumin, although a wood and fabric, or combination of wood and metal construction may be utilized if so desired.

Figure 3:
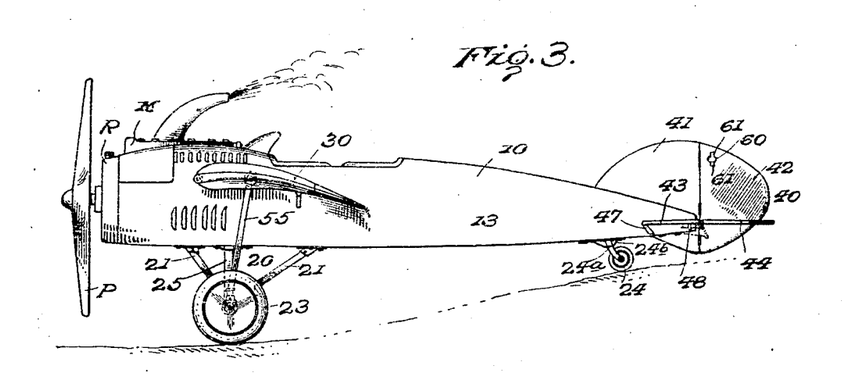
Fig. 3 is a side elevation of the embodiment of the invention shown in Fig. 1.

The body or fuselage 10 comprises the frame formed of the spaced longérons 11 converged at their opposite ends to provide the nose and tail thereof, respectively, the degree of convergence depending upon the shape to be given the fuselage, and the compression members 12 extending between the adjacent longérons 11 and secured thereto to maintain the same in rigid spaced relation, in a manner well understood by those skilled in the art, and shown in Fig. 3 of the accompanying drawings. The forward or nose end of the fuselage 10 has the radiator R of the motor cooling system mounted therein and motor bearers 14 extend rearwardly a distance along opposite sides of the interior of the fuselage frame and support a motor or other power unit M which is mounted securely thereon and substantially within the forward end of the fuselage.

The undercarriage or chassis 20 is secured to the underside of the fuselage frame in a suitable position with respect thereto to properly receive the weight and maintain the necessary balance of the airplane in landing, taking off and traveling on the ground. The chassis 20 comprises a pair of V-trusses formed of the struts 21 which are secured at their spaced diverged ends to opposite lower longérons 11 respectively, of the fuselage frame by means of suitable, or any desired fittings 21$^a$. The V-trusses formed by the struts 21 extend downwardly and outwardly from opposite lower sides of the fuselage 10 and the struts 21 of each V-truss, respectively, are converged and suitably secured together by any desired fittings, or other suitable fastening means. An axle 22 is mounted at the opposite lower converged ends of the chassis trusses and extends therebetween and a distance outwardly beyond each truss, respectively. Wheels 23, preferably of the shock absorbing type, such for example as the Atlas type of wheel, are mounted on the opposite extended ends of the axle 22. The chassis 20 so constructed and arranged provides a rigid structure which is braced at the lower ends by the axle 22 and transmits the landing and ground loads and stresses to the fuselage frame where they are evenly distributed by the V-trusses without excessive strain at any one point. The axle 22 is preferably hollow, for a purpose appearing hereinafter, and stream lined, or provided with a stream line fairing. A pair of hollow spaced stream line housings 25 are secured at their lower ends to the axle 22 and extend upwardly through the bottom of the fuselage frame at opposite sides thereof and a distance therewithin. The housings 25 are rigidly secured at their upper end portions to the opposite sides of the fuselage frame, respectively, by means of braces 25$^a$ secured to the compression members 12 of the fuselage and by the fittings 25$^b$ secured to the fuselage longérons adjacent the housings 25, respectively (see Fig. 13).

Figure 13:
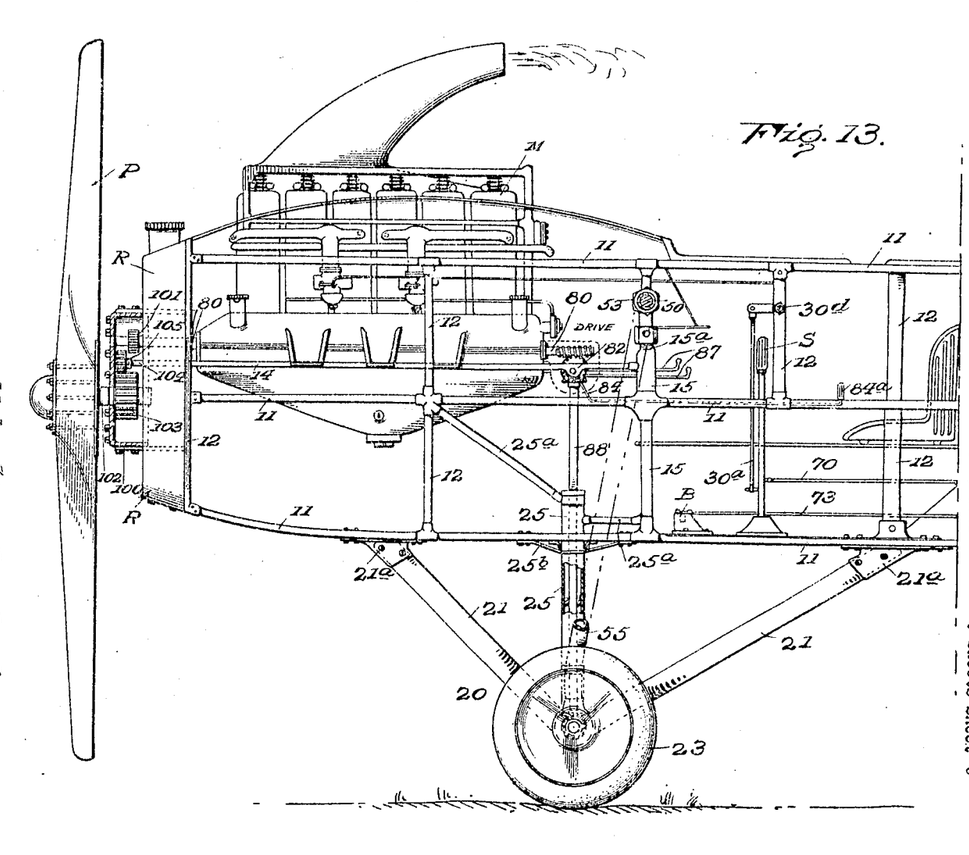
Fig. 13 is a detail side elevation of the forward portion of the fuselage with the skin thereof removed, and showing the chassis construction, engine mounting, ground propelling and steering mechanism and the control arrangement therefor.

In the assembled chassis structure the housings 25 perform the function of struts between the axle 22 and the fuselage 10 and further strengthen the chassis trusses and assist in distributing the loads and stresses therefrom to the fuselage without materially increasing the parasite resistance of the chassis while materially increasing the factor of safety. These housings perform a further function in connection with the axle 22, which will be explained hereinafter.

The rear or tail end of the fuselage 10 is supported by a wheel 24 mounted in the outer forked end of a shaft or rod 24$^a$ rotatably mounted in a suitable hanger or bracket 24$^b$ secured to the underside of the fuselage frame at the tail end thereof. The rod 24$^a$ with the wheel 24 mounted thereon performs the function of the conventional tail skid but with the added characteristic of materially assisting in steering and guiding the airplane when propelled on the ground, due to the rod 24$^a$ and wheel 24 being mounted for movement around a substantially vertical axis. The rod 24$^a$ may be pivotally mounted on a substantially horizontal axis and suitable shock absorbing means (not shown) operatively connected therewith to take up and equalize the shocks, jars and the like, due to landing, taking off and in traveling on the ground, in any of a number of ways well known and understood in this art.

The airplane illustrated herewith as embodying the features of the present invention is of the monoplane type in which a pair of alined wings extending laterally from opposite sides of the fuselage provide the main lifting or supporting surface. The term wing, as used herein, is to be interpreted in its broad generic sense as referring to and including any and all lifting or sustaining surfaces of the aerofoil type without regard to construction, curvature or form. However, in the illustrated example, a form of wing is shown peculiarly adapted to use in connection with the features of this invention.

Figure 5:
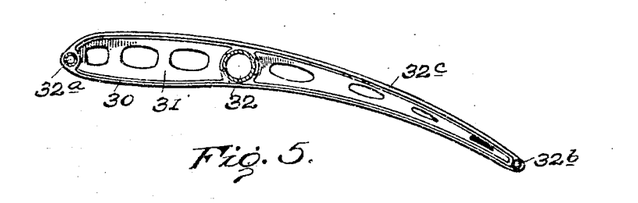
Fig. 5 is a transverse section through a wing taken on the line 5—5 of Fig. 1.

The wings 30 are similar in every respect and are constructed to provide an efficient lifting and supporting surface aerodynamically and a rigid structure of great strength and durability. Each wing comprises a series of spaced transverse ribs 31, so shaped as to give the desired wing section and a main wing beam 32 preferably formed of a length of hollow tube, extending transversely through the series of spaced ribs 31 which are rigidly secured thereon, and longitudinally of the wing. The forward ends of ribs 31 are rigidly connected by a longitudinally extending leading edge bar 32$^a$ and the trailing edges are connected and maintained in proper spaced relation by a longitudinally extending trailing edge bar 32$^b$ (see Figs. 1 and 5). A skin 32$^c$ of any suitable or desired material is secured over the wing frames and covering the upper and lower sides thereof to present a smooth, unbroken surface in which skin friction is reduced to a minimum. It will be noted that the wing beam 32 is not positioned along the longitudinal center of a wing 30 but is located a distance forwardly of this center. It is well known to those skilled in this art that the center of pressure of an aerofoil or wing is forward of the longitudinal center of the wing at normal angles of flight, and although the center of pressure varies, on the average it will be acting along the wing forwardly of the longitudinal center. In the present instance, therefore, the wing beams 32 of the wings 30 are located in the wings along the line of the normal or average centers of pressure determined for that particular type of wing. In this manner the greatest loads and stresses to which the wings are normally subjected are applied to the wings along and adjacent the wing beams.

Figures 1, 2:
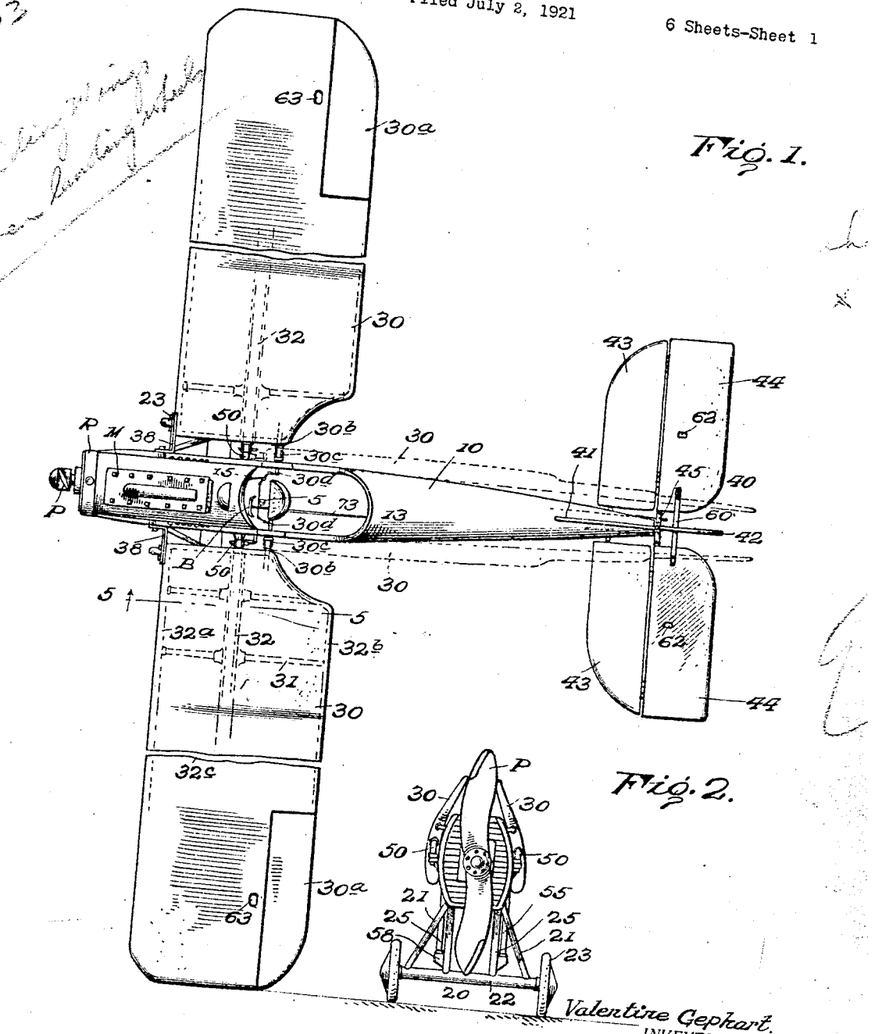
Fig. 1 is a top plan view of an airplane embodying features of the present invention.
Fig. 2 is a front elevation showing the wings and empennage in folded position.
Figures 6, 7, 8, 9:
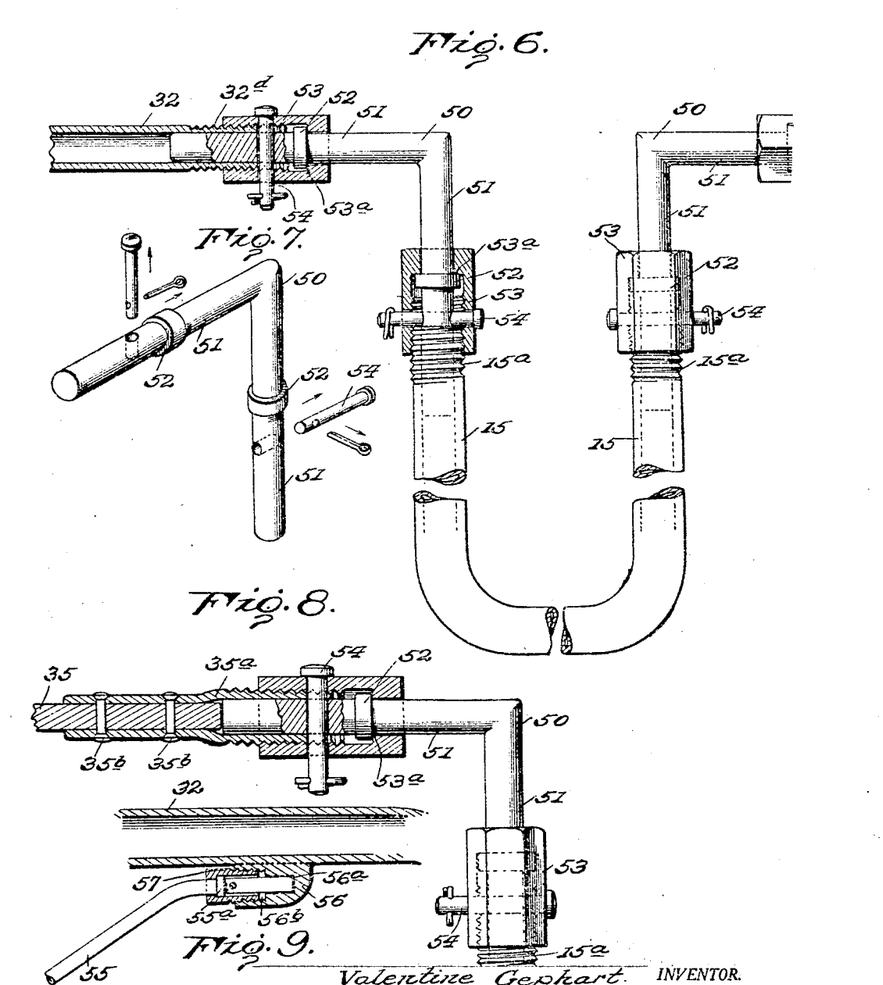
Fig. 6 is a side elevation, partly in vertical section of the wing hinges and manner of mounting the same.
Fig. 7 is a detail perspective view of an element of a wing hinge of the invention.
Fig. 8 is a detail vertical section of a modified construction of wing beam and manner of mounting the hinge of the invention thereto.
Fig. 9 is a detail vertical section of the wing brace mounting.

In accordance with the present invention, the wings 30 are mounted on opposite sides of and extending laterally from the fuselage 10, in such a manner, that they may be collapsed and folded rearwardly along the opposite sides of the fuselage in vertical planes, as indicated by the dotted lines in Fig. 1 of the accompanying drawings. The wings 30 are mounted on opposite sides of the fuselage for rotation on a horizontal axis and for pivotal rearward folding movement on substantially vertical axes at their root ends respectively. The foregoing manner of mounting the wings is accomplished by means of hinge members secured to the root ends of the wing beams and to opposite ends of a compression member forming a part of the fuselage frame, respectively. Referring particularly to Figs. 6 and 13, the fuselage frame is provided with a compression member 15 extending therearound and forming an integral element of the frame. The compression member 15 is preferably formed of a length of tubing and is positioned in the fuselage frame, so that it is opposite the root ends of the wing beams 32, respectively, and with its opposite ends terminating a distance below the plane of the wings with the wings in normal position with respect to the fuselage 10. In the example illustrated, the compression member 15 is formed of a single continuous length of tubing bent into substantial U-form to extend across the lower side of the frame and a distance upwardly along the opposite sides thereof and forming one of the series of fuselage compression members connecting and securing the fuselage longérons 11 in proper rigid spaced position in the frame. The upper opposite open ends of the compression member 15 are adapted to receive the hinge members by means of which the wings 30 are foldably mounted on the fuselage, and the end portions 15ª of the compression member 15 are exteriorly screw threaded, respectively, for a purpose explained hereinafter.

The hollow beams 32 of the wings 30 are extended at the root ends thereof a distance beyond the wings and are exteriorly screw threaded at 32ᵈ, and these root ends of the wing beams 32 are adapted to receive the hinge members, described hereinafter, which are mounted in the opposite ends of the compression member 15 and thus foldably confine the wings 30 to the fuselage 10.

The pivotal connections between the wings 30 and the fuselage 10 are formed by means of what are herein termed wing hinge members 50, which are shown in detail in Figs. 6, 7, 8 and 9 of the accompanying drawings. The wing hinge members 50 are similar in all respects and each comprises a preferably solid, cylindrical rod or bar bent, or otherwise formed, to provide the lengths 51 extending at right angles to each other. The lengths 51 are provided with the collars 52 intermediate the ends thereof, respectively, sleeves 53 each having an internal diameter greater than the external diameter of the lengths 51 and collars 52, and a shoulder 53ª partially closing one end of the same to provide a bore therethrough of a diameter to receive the lengths 51 but of smaller diameter than the collars 52, are loosely confined on each length 51, by collars 52 and the shoulders 53ª, respectively. The collars 53 are loosely mounted on the lengths 51, respectively, of the wing hinge members 50, and are capable of rotation thereon and movement longitudinally thereof between the collars 51, respectively, adjacent thereto, as will be clearly understood by reference to the drawings. The outer open end of the sleeves 53 of each hinge member 50, are internally screw threaded and adapted to fit over and be secured onto the external threads of the wing beams 32 and end portions of the compression member 15, respectively.

The diameter of the lengths 51 of the wing hinge members 50 is less that the internal diameters of the compression member 15 and the wing beams 32, respectively. A wing hinge member 50 is mounted on each side of the fuselage 10 by one of the lengths 51 thereof extending downwardly and rotatably within the open ends of the compression member 15 and with the respective adjacent lengths of each hinge member 50 extending at right angles therefrom and horizontally and outwardly from opposite sides of the fuselage, respectively. The internally threaded sleeves 53 of the lengths 51 mounted in the compression member 15, are screwed onto and over the respective externally threaded end portions 15ª of the compression member 15 and securely and rigidly bind and lock the hinge members 50 into position on the fuselage at opposite sides thereof. A locking pin 54 is removably inserted transversely through alined bores provided in each sleeve 53, the length 51 upon which it is confined and the end portion of the compression member 15 onto which it is screwed respectively, to prevent turning of the hinge members 50 in the ends of the compression member 15 and to further prevent accidental unscrewing of the sleeves 53 through vibration or the like.

The wings 30 are mounted on the opposite outwardly and horizontally extending lengths 51 secured in the ends of the compression member 15, respectively. The hollow extended root ends of the wing beams 32 of each wing 30 are fitted over the opposite horizontal lengths 51 of the hinge members 50, respectively, and the sleeves 53 are screwed onto and over the externally threaded portions of the wing beams 32 to draw the wings 30 into position on the wing hinge members 50, respectively, and rigidly secure the same thereon and extending horizontally and laterally from the opposite sides of the fuselage 10.

Locking pins 54 are removably inserted transversely of each sleeve 53 and wing beam 32 on which the sleeve is fastened, and traverse the hinge member 50 therewithin, respectively, to prevent the wings from turning on the hinge members in normal mounted position, in a manner similar to that hereinbefore explained and described with reference to the locking pins 54 securing the hinge members 50 to the compression member 15.

In Fig. 8, of the accompanying drawings, I show a possible manner of securing a wing constructed with a wooden wing beam 35, or a solid wing beam of any material, to the wing hinge member 50. The root end of the wing beam 35 has a length of tube 35$^a$ secured thereover, by means of rivets or bolts 35$^b$, and this tube extends a distance beyond the end of the beam 35 to provide a socket for the horizontal length 51 of the wing hinge member 50. The extended end of the tube is externally screw threaded and the wing is mounted on the hinge member 50 in the same manner by the sleeve 53, as explained in connection with a wing 30 having the tube 32 providing the wing beam thereof.

From the foregoing it will be apparent that by removing the locking pins 54 and unscrewing the sleeves 53, the wings 30 can be revolved about the horizontal axis provided by the beams 32 which are mounted on and over the horizontal extending lengths 51 of the wing hinge members 50. Then by removing the locking pins 54 which are inserted through the end portions of the compression member 15 and unscrewing the sleeves 53 by which the wing hinge members 50 are secured to and in the end portions of the compression member 15, respectively, the wings 30 mounted on and secured to the wing hinge members can be swung or folded rearwardly on the vertical axes provided by the vertically disposed lengths 51 of the hinge members mounted and rotatable in the end portions of the compression member 15, respectively.

As usual in monoplane design, except in those cases where internally braced wings of the cantilever, or similar types are utilized, it is necessary to provide exterior struts or braces from the outer or tip portions of the wings to the fuselage or chassis structure to assist the wings in carrying the flying and landing loads, stresses and strains to which they are subjected and prevent collapse of the wings. In the present invention the wings 30 are provided with the exterior wing braces 55 extending from points located in line with the wing beams 32 at the outer or tip portions thereof to points at opposite sides of the chassis 20 adjacent the housings 25, respectively. Due to the pivotal wing mountings to provide for folding of the wings it is necessary to construct and mount the wing braces 55 in a novel manner, so that they not only perform the conventional function of exterior wing braces but perform added functions in the operation of folding the wings from normal, flight position. At the outer or tip portions of the wing beams 32 of the wings 30, the socket fittings 56 are secured to the under sides of the beams and extend from the under side of the wings to the exterior thereof, respectively, and are suitably stream lined to reduce resistance in flight.

The construction of the fittings 56 is clearly illustrated in Fig. 9 of the accompanying drawings. Each fitting 56 is provided with the bore 56$^a$ extending thereinto from the inner or fuselage end and forming a socket. The open end of the socket or bore 56 is enlarged as shown at 56$^b$ and interiorly threaded. The outer extremities of the wing braces 55 are bent to extend horizontally and rotatably fit and be confined within the wing sockets of the fittings 56, respectively. The braces 55 are confined in the socket fittings 56 by means of the sleeves 57 which are loosely and rotatably confined thereon by collars 55$^a$ provided on the horizontally disposed lengths of the braces 55, respectively, in a manner similar to that described in connection with the sleeves 53 of the wing hinge members 50. The brace sleeves 57 are internally screw threaded to fit within and be rotated into the enlarged internally threaded bores 56$^b$ of the fittings 56, respectively, and confine the braces within and securely to the socket fittings 56. Any suitable or desired locking means, such as a pin 57$^a$ (Fig. 9) may be used to prevent sleeve 57 from becoming unscrewed and release the brace from the socket. The wing braces 55 extend downwardly and inwardly to opposite sides of the chassis 20 where they are rotatably confined in vertically disposed sockets 58, the lower extremities of the braces providing vertically disposed lengths for mounting in the sockets, which sockets are secured to the outer sides of the housings 25, respectively, adjacent the axle 22. Locking means (not shown) of any suitable or desirable type may be utilized to rigidly maintain the wing braces in the sockets 58 with the wings 30 in normal flight position.

The wing braces 55 mounted in the socket fittings 56 and 58, respectively, in normal, extended position of the wings, support the wings and distribute the landing and flying loads and stresses from the outer portions of the wings to the chassis 20, and when the wings are folded continue to perform their supporting functions, while at the same time providing pivots upon which the wings are swung in folding. The operation and functions of the wing braces 55 are more fully explained and described hereinafter.

Figures 10, 11, 12:
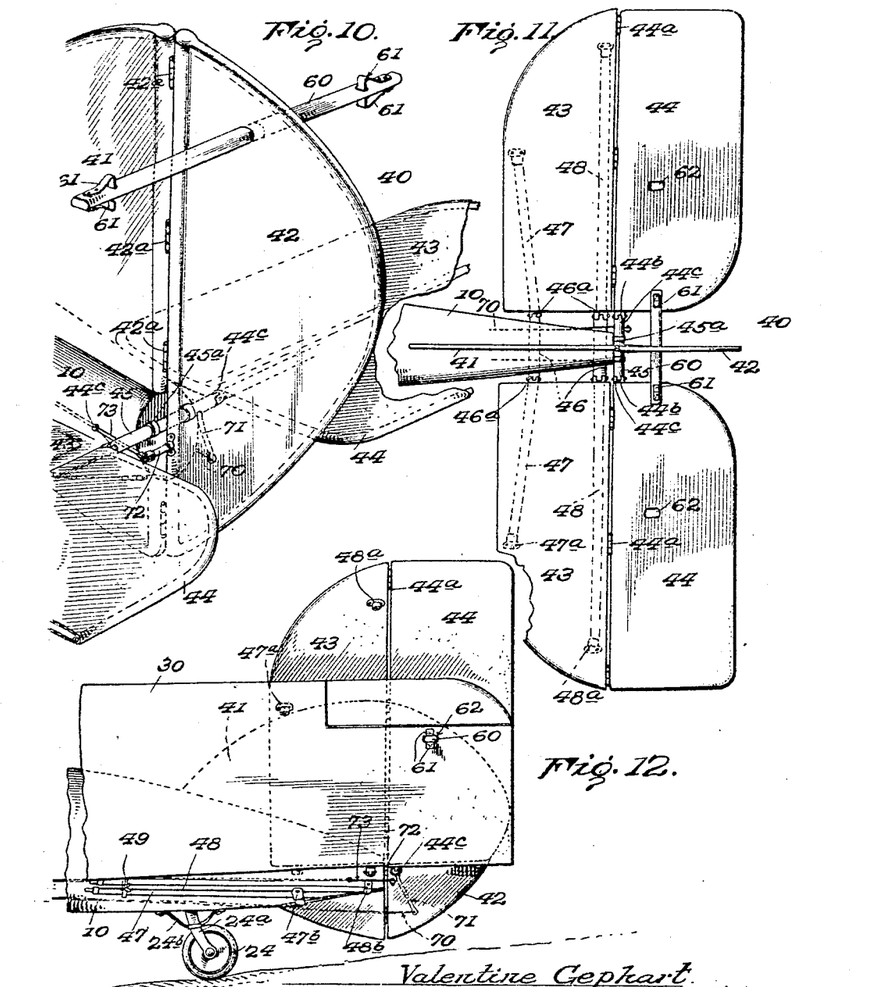
Fig. 10 is a detail perspective view of the empennage and manner of mounting the surfaces thereof.
Fig. 11 is a top plan view of the empennage assembly.
Fig. 12 is a detail view in side elevation of the empennage and wings in collapsed and folded position, the tail end portion of the fuselage and the outer tip portions of the wings only being shown.

The empennage 40, see particularly Figs. 10, 11 and 12, has the horizontally disposed laterally extending surfaces thereof mounted for folding movement to vertical position, in order to cooperate with the wings 30 and permit rearward movement thereof to a position along the sides of the fuselage 10 without interference from the horizontal surfaces of the empennage. The empennage assembly includes a vertical fin or stabilizer 41 rigidly mounted centrally of the upper side of the tail end of the fuselage and with its trailing edge terminating approximately at the rear edge of the fuselage. A rudder 42 is pivotally mounted at the tail end of the fuselage and the trailing edge of the vertical stabilizer 41 by means of the hinges or the like pivotal connections 42ª securing the rudder 42 to the trailing edge of the vertical fin and permitting lateral swinging movement of the rudder, as well understood in this art.

Horizontal stabilizers 43 are mounted on the tail end portion of the fuselage 10 and extend laterally from opposite sides thereof, respectively. Each horizontal stabilizer 43 has an elevator 44 pivotally mounted to its trailing edge by means of the pivotal connections or hinges 44ª. A shaft 45 is rotatably mounted horizontally across the rear end of the fuselage 10 in the bearings 45ª and in line with the leading edges of the opposite elevators 44.

The opposite ends of the shaft 45 are pivotally connected to the opposite inner ends of the leading edge beams 44ᵇ of the elevators 44, which beams are extended a distance beyond the elevators and pivotally joined to and connected together by the shaft 45. The shaft 45 and the elevator beams 44ᵇ are connected to provide hinge joints 44ᶜ between the ends of the shaft 45 and the ends of the elevator beams 44ᵇ, respectively adjacent thereto.

Each horizontal stabilizer 43 has a forward longitudinal wing beam and a rear longitudinal wing beam, respectively, extended a short distance beyond the inner side edge thereof adjacent the fuselage 10. A pair of compression members 46, spaced apart a distance equal to that between the forward and rearward extended stabilizer beams of the stabilizers 43, respectively, and forming elements of the tail end portion of the fuselage frame are extended a distance outwardly from opposite sides of the fuselage 10 in line with the respective extended stabilizer beams adjacent thereto. Pivotal hinge connections 46ª are made between each pair of compression members 46 and the extended beams of each stabilizer 43, respectively, so that the stabilizer 43 can be swung vertically on the hinges 46ª to folded position extending vertically along the opposite sides of the fuselage 10.

In order to properly brace and support the stabilizers 43, with the elevators 44 pivotally mounted thereon, against collapse in normal extended position thereof, each stabilizer is provided with a pair of exterior struts 47 and 48 extending from the lower side of the stabilizer to and secured on the fuselage 10. The strut 47 extends from a socket fitting 47ª secured on the under side of the forward beam of a stabilizer 43 to a hinge fitting 47ᵇ secured to or integral with the forward compression member 46 of the fuselage frame, and the strut 48 extends from a socket fitting 48ª secured on the under side of the rear beam of a stabilizer 43 to a hinge fitting 48ᵇ secured to or integral with the rear compression member 46. The struts 47 and 48 are pivotally mounted in the hinge fittings 47ᵇ and 48ᵇ, respectively, for substantial horizontal swinging movement, and the outer ends of the struts 47 and 48 are removably locked into the socket fittings 47ª and 48ª, respectively of a stabilizer 43. When it is desired to fold the stabilizers 43 and elevators 44, the outer ends of the struts 47 and 48 of each stabilizer are unlocked and removed from the socket fitting 47ª and 48ª, respectively, and the struts are then swung forwardly on the vertical pivots provided by the hinge fittings 47ᵇ and 48ᵇ, respectively, to which the inner ends of the struts are secured, to a substantially horizontal position along the side of the fuselage where they are securely fastened into folded position by any suitable or desired fastening means, such for example, as the straps 49 (see Fig. 12). After release of the struts 47 and 48 from each stabilizer 43, the stabilizers and elevators 44 pivotally secured thereto along the trailing edges thereof, may be swung vertically on the horizontally disposed pivots provided by the hinge connections 46ª between the fuselage 10 and the stabilizers, and the hinge joints 44ᶜ between the elevators and the shaft 45 connecting the same, respectively.

Means for locking the wings 30 and the horizontal surfaces 43, 44 of the empennage into folded position is provided, and consists of the locking bar 60 extending transversely through the rudder 42 and secured intermediate its ends to the frame structure of the rudder. The locking bar 60 is properly stream lined and extends laterally and horizontally a distance outwardly from each side of the rudder 42. The outer ends of the locking bar are each provided with a pair of spring clips 61 (see Fig. 10) secured to the upper and lower sides, respectively, of the bar and normally in raised locking position.

An aperture 62 is formed through each elevator 44 at such a distance from the inner or rudder edge thereof that with the elevators in raised folded position the apertures 62 are alined with the opposite ends, respectively, of the locking bar 60. Each of the wings 30 is also formed with an aperture 63 therethrough at such a point therein that with the wings in vertical rearwardly folded position along the sides of the fuselage 10, the apertures 63 will be alined with the opposite ends of the bar 60, respectively.

The wings 30 are provided with the conventional or any desired lateral control surfaces, such as the ailerons 30ª, which are operated by means of control wires or rods 30ᵇ extending within the wings from the ailerons 30ª through the root ends of the wings where they are detachably connected by means of the connections 30ᶜ to the ends of control levers 30ᵈ extending from opposite sides of the fuselage in line with the control rods 30ᵇ, respectively, as shown in Figs. 1 and 13, of the accompanying drawings. The control levers 30ᵈ are connected in a manner well understood by those skilled in this art to the control stick S mounted in the cockpit of the fuselage.

With the wings 30 in normal laterally extended flight position it is desirable to provide bracing means between the root ends of the leading edges of the wings and the opposite sides of the fuselage 10, respectively, in order to more securely and rigidly brace the wings and to insure against the wings folding in flight, if by accident or inadvertence, the wing hinge members 50 and their connections should become unlocked. In the present instance, I show locking plates 38 rigidly secured to opposite sides of the fuselage 10, respectively, and each extending over and a distance along the leading edge of the wing 30 where they are detachably secured thereto.

The airplane described hereinbefore is provided with a more or less conventional type of control system consisting of the control stick S mounted in the fuselage and operatively connected with the aileron control rods 30ᵇ by the levers 30ᵈ in such a manner that lateral movement of the stick S operates the ailerons 30ª. The stick S is also operatively connected with the elevators 44 by means of wires or a rod 70 extending rearwardly through the fuselage to the tail end thereof where it is secured to the lower end of a control horn or rod 71 which is secured to the shaft 45 and depends downwardly and outwardly therefrom, so that longitudinal movement of the control stick S will push or pull the rod 70 to rotate the shaft 45 and raise or lower the elevators 44 therewith. The rudder 42 is provided with a laterally extending control horn 72 and a rod 73 is connected therewith and extends into and through the fuselage 10 to a foot operated rudder bar B located in the cockpit of the fuselage 10.

Figure 4:
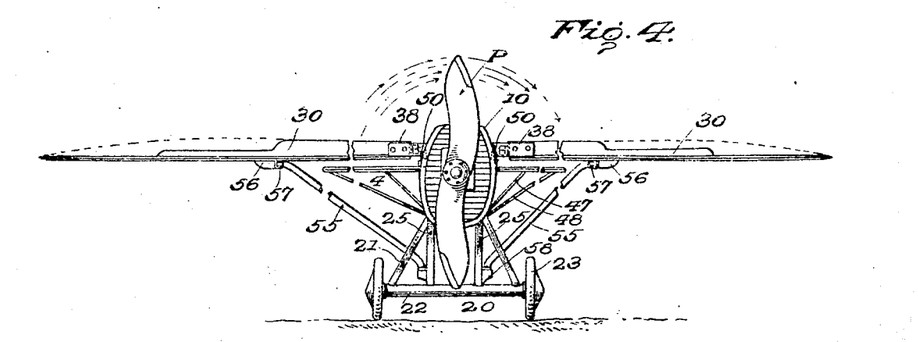
Fig. 4 is a front elevation showing the wings and empennage constructed and mounted in accordance with the invention in normal position for flight.

In normal, extended position for flight, the wings 30 and empennage 40 are in the position shown in Figs. 1, 3, and 4, with the various securing and locking means, hereinbefore referred to and described, rigidly and securely maintaining these surfaces in proper position and alinement. It will be noted that the wings 30 are mounted on a compression member forming an element of the fuselage frame by the hinge members 50 connected and secured to the root ends of the wing beams 32, and that the exterior wing braces are likewise connected between the tip lengths of the wing beams and elements of the chassis structure. It has been pointed out that the wing beams 32 are located in the wings 30 along the lines of greatest stress, and therefore it will be readily seen and appreciated that due to the manner of mounting the wings, the landing and flying loads and stresses to which the wings are subjected in operation and use will be evenly distributed from the wings to elements of the fuselage and chassis structure which are constructed to receive and absorb these strains and stresses from the wings. A similar arrangement and mounting is employed with the foldable surfaces of the empennage, these surfaces being mounted on the fuselage by pivotal connections between the beams of the elevators and compression members of the fuselage.

In order to fold the wings and empennage, the exterior struts 47 and 48 of the elevators are removed from the socket fittings 47ª and 48ª, respectively, and are folded forwardly along opposite sides of the fuselage where they are secured by the straps 49. The stabilizers 43 and elevators 44 are then swung vertically on the pivotal connections 46ª and 44ᶜ, respectively, by which they are mounted, until the apertures 62 in the elevators are in line with the opposite ends of the locking bar 60, respectively. The spring clips 61 are then depressed and the elevators 44 slide thereover and onto the bar 61 which maintains the elevators in folded position. The locking pins 54 are removed from the wing hinge members 50 and the sleeves 53 are unscrewed to release the hinge members on the compression member 15 and the wing beams 32, and the sleeves 57 of the wing brace sockets 56 are released and unscrewed to permit rotation of the wings thereon.

The connections 30ᶜ are actuated to disconnect the aileron control rods from the control levers 30ᵈ mounted in the fuselage. The wings 30 are then revolved forwardly around the axis of the wing beams on the horizontally disposed lengths 51 of the hinge members 50 and the ends of the wing braces 55 in the sockets 56, respectively, as pivots, until the wings are in a substantially vertical position with the leading edges thereof downward. From this position the wings 30 are swung rearwardly on the vertically disposed lengths 51 of the hinge member 50 rotatably mounted in the opposite ends of the compression member 15, respectively, and the wing braces 55 rotatably mounted in the sockets 58 secured to the chassis 20. The apertures 63 through the tip portions of the wings 30 will be in alinement with the locking bar 60 when the wings are swung rearwardly, and the wings are moved onto and slide over the opposite lengths of the bar 60, respectively, which extend beyond the folded stabilizers and in position thereon. The bar 60 extends through the apertures 63 and the wings are removably locked thereon in folded position by the spring clips 61 on the outer ends of the locking bar 60. Thus, in folded position the stabilizers 43 and elevators 44 of the empennage assembly 40 and the wings 30 are compactly located in vertical planes along opposite sides of the fuselage 10, respectively, with the empennage surfaces between the wings 30 and the vertical fin 41 and rudder 42. The wings 30 are maintained in vertical folded position by the locking bar 60, and are supported against excessive strains in this position by the wing braces 55 between the wings and the chassis 20. The folded empennage surfaces are maintained in vertical position between the wings 30 and the vertical fin 41 and rudder 42 by the wings which are folded thereagainst. It is apparent that with the wings and empennage surfaces in folded position, the airplane can be stored in a comparatively small space of width slightly greater than the tread or breadth of the chassis 20.

The operation of unfolding and returning the wings and empennage surfaces to normal extended position for flight will be readily understood from the foregoing explanation and description of the collapsing and folding operation. With the wings 30 mounted in accordance with the present invention, they may be readily dissembled and assembled without the services of a skilled rigger as it is only necessary to place the wings in position on the hinge mountings 50 and secure the exterior braces in place and they are in proper alinement and position on the fuselage 10.

Figure 14:
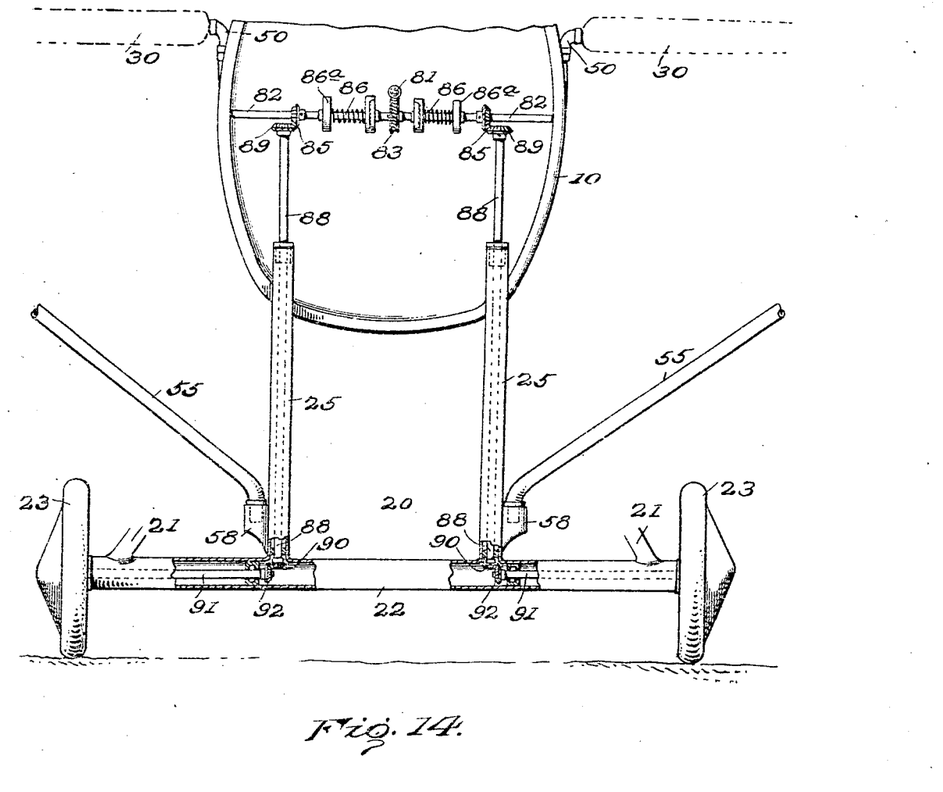
Fig. 14 is a transverse section more or less diagrammatical, through the fuselage aft of the motor and showing the ground propelling and steering mechanism and manner of connecting the same with the chassis and landing wheels thereof.

The invention includes mechanism for propelling and steering the airplane as a ground vehicle when the wings are folded. Referring particularly to Figs. 13 and 14 of the accompanying drawings, wherein this mechanism is illustrated in detail, the crank shaft 80 of the motor M which supplies the power for propelling the airplane in flight, is extended rearwardly beyond the crank case of the motor and provided with a worm gear 81. A horizontally disposed shaft 82 extends transversely of the fuselage 10 below the worm gear 81, and is mounted for rotation in any suitable or desired bearings. A gear 83 is slidably mounted on the shaft 82 for movement into and out of mesh with the worm gear 81. A control rod 84 is operatively connected with the sliding gear 83 and extends rearwardly to the cockpit of the fuselage where it is provided with an operating handle 84ᵃ by means of which the pilot can actuate the rod 84 to move the gear 83 into and out of mesh with the worm gear 81. A pair of bevel gears 85 are loosely mounted on the shaft 82 at opposite sides of the gear 83 approximately above the housings 25, respectively, which extend upwardly into the fuselage from the axle 22 of the chassis 20. Each of the bevel gears 85 is operatively connected with a friction clutch 86 which is normally in engagement therewith to rotate the said gears 85 from the shaft 82 when driven by the worm gear 81 from the crank shaft 80.

Clutch operating levers 87 are connected with the clutches 86, respectively, and extend into the cockpit of the fuselage where they may be selectively operated to disengage the bevel gears 85 from the respective clutch 86 connected therewith.

Each gear 85 is provided with a brake 86ᵃ, respectively in operative connection therewith and normally in released inoperative position with respect thereto. In the illustrated example the brakes 86ᵃ are diagrammatically illustrated and are preferably of the contracting and expanding band type, although any desired type may be utilized. The brakes 86ᵃ are provided with any suitable or desired means (not shown) for selectively applying and releasing the same, respectively, and this means is so arranged as to be operable by the pilot from the cockpit of the fuselage, which will be readily understood and appreciated by those skilled in the art.

Vertically disposed shafts 88 are journaled in suitable bearings in the streamline housings 25 and are provided with the bevel gears 89 fixed thereon to rotate therewith at the upper ends of the shafts 88 and in mesh with the bevel gears 85, respectively. The housings 25 open into the hollow chassis axle 22 and the shafts 88 are provided with the bevel gears 90 extending a distance into the hollow axle 22. Each of the wheels 23 is provided with a shaft 91 operatively connected to rotate therewith, extending inwardly through the axle 22 and terminating at the housing 25 and shaft 88 adjacent thereto. The inner ends of the shaft 91 have the bevel gears 92 secured thereon and in mesh with the bevel gears 90 of the shafts 88, respectively.

The operation of the above described mechanism for propelling and steering the airplane on the ground is as follows: the sliding gear 83 is moved into mesh with the worm gear 81 by means of the operating lever 84, which with the motor M running causes rotation of the shaft 82. As the clutches 86 are normally in engagement with the gears 85, and the brakes 86ª, are normally released, these gears are rotated by the shaft 82 and clutches 86 which rotate the shafts 88 through the bevel gears 89 in mesh with the gears 85. The rotation of the shafts 88 rotates the shafts 91 and the wheels 23 connected therewith, through the enmeshed bevel gears 90 and 92, respectively. Thus the chassis wheels 23 act as traction or drive wheels to propel the airplane on the ground through power derived from the crank shaft of the motor M. In order to steer the airplane when propelled on the ground in the foregoing manner, the clutches 86 are operated by the end levers 87.

When it is desired to turn the airplane, one of the levers 87 is actuated to disengage the clutch 86 connected therewith, which disconnects the respective gear 85 normally engaged therewith from the drive shaft 82 and consequently withdraws the driving power from the wheel 23 which is driven thereby, thus causing said wheel 23 to lose its traction effect. The respective brake 86ª of the disconnected gear 85 is then applied to stop free rotation of the idle wheel 23 and cause the opposite power driven wheel 23, respectively, to turn the airplane on the disconnected wheel as a pivot. This operation can be performed with either wheel to turn the airplane in the desired direction, and the power applied to or withdrawn from the wheels can be regulated by permitting the clutch 86 which is actuated to slip sufficiently to transmit the desired power to the wheel 23 operated thereby. The turning and steering is further controlled and regulated by the force and extent with which the respective brakes 86ª are applied, so that in the foregoing manner the desired turns can be made and the airplane steered with the required accuracy to permit its being driven as a ground vehicle. It will be noted in this connection that the pivotally mounted wheel 24 which supports the tail end of the fuselage and performs the function of the conventional tail skid permits and materially assists in driving and steering the plane as a ground vehicle in the manner hereinbefore described.

When the airplane is driven as a ground vehicle by the motor and propelling mechanism hereinbefore described, it is very desirable that the propeller by means of which the airplane is propelled in the air be rendered inoperative for obvious reasons. The invention provides a propeller drive gear by means of which the propeller can be disengaged from the motor and remain idle during operation of the ground propelling mechanism. This drive gear is shown in Fig. 13 of the accompanying drawings and includes a gear housing 100 located on the front of the radiator R in which the mechanism is mounted. The forward end of the crank shaft 80 is extended through the radiator R and into the casing 100. A gear 101 is mounted on the extended end of the crank shaft within the housing 100 adjacent the radiator side thereof. A propeller shaft 102 is suitably journaled in the housing below the crank shaft 80 and extends outwardly through the housing and is provided with the propeller P secured thereon in the conventional or any desired manner. The propeller shaft 102 has a gear 103 mounted thereon of such a diameter as to leave a space between it and the gear 101 of the crank shaft 80. A shaft 104 is mounted between the shaft 102 and the crank shaft 80 and is provided with an idler gear 105 of a diameter equal to the gear 101 and having the same number of teeth as the gear 101. The shaft 104 and gear 105 are mounted for sliding movement and any suitable operating rods or levers (not shown) can be provided for operating the shaft 104 and gear 105. The idler gear 105 is in mesh with the propeller gear 103 and when moved inwardly toward the radiator side of the housing 100 meshes with the crank shaft gear 101, the width of the propeller gear 103 being such that the idler gear remains in mesh therewith. In normal position for flight the idler gear 104 is in mesh with the crank shaft gear 101 and the propeller gear 103 and the propeller is driven by the motor M through these enmeshed gears. However, when the airplane is to be operated as a land vehicle and driven by the ground propelling mechanism, the idler gear 105 is slid forward into position out of engagement with the crank shaft gear 101 and the propeller remains idle. The propeller drive gear performs the further function of a reduction gear and any desired ratio between the gears 101, 103 and 105 may be used to obtain the desired propeller speed. It is not essential that the propeller drive gear be located on the front of the radiator, as it may be located to the rear of the radiator within the fuselage, or at any other desired or suitable point, this being merely a matter of expediency and design.

With an airplane constructed in accordance with the present invention and embodying the features hereinbefore pointed out and described, it is possible by folding the wings and horizontal empennage surfaces to drive the airplane as a land vehicle over roads and through city streets to and from the place of storage and the flying field. When the airplane is so driven the propeller drive gear can be disconnected to permit the propeller to remain inoperative and idle, thus eliminating possible danger to pedestrians and traffic, and rendering the plane more responsive to the steering mechanism. The construction and mounting of the foldable surfaces is such that the head or parasite resistance of the plane is not increased over the parasite resistance of conventional types and the design of the airplane of the invention is particularly clean. The peculiar construction and mounting of the pivotal or hinge connections between the collapsible and foldable surfaces and the fuselage and chassis provides a structure in which the factor of safety is in no wise decreased. A number of other features and advantages have been pointed out hereinbefore, and others will be apparent and appreciated by those familiar with and skilled in this art.

It is evident that various changes, modifications, variations and departures might be resorted to without departing from the spirit and scope of my invention and hence I do not wish to limit the invention to the exact disclosures hereof.

Desiring to protect my invention in the broadest manner legally possible, what I claim is:

1. In an airplane, a fuselage, an empennage mounted thereon, supporting surfaces mounted on opposite sides of said fuselage and normally extending laterally therefrom, said supporting surfaces rotatable on a longitudinal axis and pivoted for rearward swinging movement to folded position along opposite sides of the fuselage, respectively, means for securing said wings in normal position, and means on said empennage for locking said wings in folded position.

2. In an airplane, a fuselage, supporting surfaces mounted on opposite sides of said fuselage and in normal position extending laterally therefrom, exterior struts for said supporting surfaces, and the said supporting surfaces and exterior struts mounted for folding rearwardly in normal connected relation to positions along opposite sides of the fuselage, respectively, with said supporting surfaces in substantially vertical position.

3. In an airplane, a fuselage, a chassis therefor, supporting surfaces pivotally mounted on opposite sides of said fuselage and in normal position extending laterally therefrom, exterior struts extending from said supporting surfaces to said chassis, and said supporting surfaces and struts therefor foldable to position with the said supporting surfaces substantially vertically disposed along opposite sides of said fuselage, respectively, without disconnecting said struts.

4. In an airplane, a fuselage, a chassis, supporting surfaces mounted on opposite sides of said fuselage and in normal position extending laterally therefrom, exterior struts extending from said supporting surfaces to opposite sides of said chassis and pivotally connected therewith, respectively, and the said supporting surfaces and exterior struts therefor mounted for folding to position along opposite sides of the fuselage, respectively, without disconnecting said struts from normal position connected between said supporting surfaces and chassis.

5. In an airplane, a fuselage, a chassis, supporting surfaces mounted on opposite sides of said fuselage and in normal position extending laterally therefrom, exterior struts extending from the outer portions of said supporting surfaces to opposite sides of said chassis, said supporting surfaces pivotally mounted at the root ends thereof to said fuselage and at the outer portions to said struts, respectively, for rotation on axes longitudinally thereof, and said supporting surfaces and struts foldable rearwardly along opposite sides of the said fuselage, respectively.

6. In an airplane, a fuselage, a chassis, supporting surfaces mounted on opposite sides of said fuselage and in normal position extending laterally therefrom, struts extending between the outer portions of said supporting surfaces and opposite sides of said chassis, said supporting surfaces pivotally mounted at the root ends thereof to the fuselage and at the outer portions thereof to said struts, respectively, for rotation on axes longitudinally thereof to substantially vertical position, and said braces pivotally mounted on said chassis and the pivotal mountings at the root ends of said supporting surfaces capable of rotation on a substantially vertical axis, whereby said supporting surfaces when rotated to vertical position can be folded rearwardly along opposite sides of said fuselage, respectively.

7. In an airplane, a fuselage frame including a series of longerons and compression members, and a supporting surface provided with a longitudinal beam, the said supporting surface mounted on said fuselage frame by a pivotal connection between the root end of said beam and a compression member of said fuselage, respectively, whereby a portion of the supporting surface load is transmitted and distributed through said pivotal connection directly to the compression member with which connected.

8. In an airplane, a fuselage frame including a compression member extending therearound, and supporting surfaces in normal position extending laterally from opposite sides of said fuselage frame and pivotally mounted at the roots thereof to opposite sides of said compression member, respectively, whereby the supporting surface loads are transmitted directly and equally distributed to said compression member.

9. In an airplane, a fuselage frame including a compression member extending therearound, and supporting surfaces extending laterally from opposite sides of said frame, each of said supporting surfaces provided with a longitudinal beam pivotally mounted at the root end thereof to a side of said compression member, respectively, whereby supporting surface loads are transmitted by said beams directly to said compression member.

10. In an airplane, a fuselage frame including a substantially U-shaped compression member extending around the lower portion thereof and with its ends terminating on opposite sides of the said frame, and supporting surfaces extending laterally from opposite sides of said fuselage frame, each of said supporting surfaces formed with a longitudinal beam pivotally mounted at the root end thereof to an end of said compression member, respectively, the said supporting surfaces being foldable on said pivotal mountings to positions along opposite sides of the fuselage, respectively.

11. In an airplane, a fuselage, a supporting surface extending laterally from said fuselage, and a hinge member having a laterally extending portion upon which the root of said surface is mounted and a substantially vertical portion mounted on said fuselage and securing said supporting surface in position thereon, and means on the laterally extending portion of said hinge member for detachably securing the root of said surface thereon.

12. In an airplane, a fuselage, a supporting surface in normal position extending laterally from said fuselage, and a hinge member mounted on a structural element of said fuselage for rotation around a substantially vertical axis and having a laterally extending member upon which the root of said supporting surface is mounted, and means for detachably locking the supporting surface to the laterally extending member.

13. In an airplane, a fuselage frame including a compression member having substantially vertically disposed lengths on opposite sides of said frame and providing sockets at the upper ends thereof, respectively, hinge members rotatably mounted in said sockets, said hinge members provided with laterally extended portions, and supporting surfaces in normal position extending laterally from opposite sides of said fuselage frame and mounted on said laterally extending portions of said hinge members, respectively, for rotation thereon.

14. In an airplane, a fuselage frame including a compression member providing a socket, a hinge member rotatably mounted in said socket on said compression member for rotation around a substantially vertical axis, said hinge member provided with a laterally extending portion, and a supporting surface provided with a longitudinally disposed socket for rotatably mounting the said surface on said laterally extended portion of said hinge member.

15. The combination in an airplane of a fuselage and a hinge member pivotally mounted thereon and extending laterally therefrom, with a supporting surface provided with a hollow longitudinal beam rotatably mounted at the root thereof on said hinge member as an axis, and means on said hinge member for detachably locking the supporting surface thereto.

16. In an airplane, the combination with a fuselage and a hinge member extending laterally therefrom, of a supporting surface provided with a hollow longitudinal beam at the root end rotatably mounted on said hinge member, and means on said hinge member for detachably engaging the root end of said beam to lock the supporting surface against rotation.

17. In an airplane, the combination with a fuselage, a hinge member pivotally mounted thereon and locking means for said hinge member, of a supporting surface provided with a hollow longitudinal beam at the root end rotatably mounted on said hinge member, and means on said hinge member for locking said supporting surface in position thereon.

18. A hinge for foldably mounting a supporting surface on an airplane, comprising a bar formed to provide lengths at an angle to each other, each of said lengths provided with a locking sleeve and one of said lengths adapted to be removably locked to the airplane fuselage and the other of said lengths adapted to be removably locked to a supporting surface by the said sleeves, respectively.

19. A hinge for foldably mounting a supporting surface to the fuselage of an airplane, comprising a bar formed to provide lengths at an angle to each other, each of said lengths having a collar adjacent the end portion thereof, and locking sleeves loosely confined on said lengths by said collars, respectively.

20. In an airplane, the combination with empennage surfaces foldably mounted, of supporting surfaces foldably mounted, and adapted when folded to confine the empennage surfaces in folded position, and means carried by the empennage for locking said empennage surfaces and supporting surfaces in folded position.

21. In an airplane, the laterally disposed empennage surfaces foldable to vertical position, and means mounted on the vertical empennage surfaces for maintaining said lateral surfaces in position when folded.

22. In an airplane including a fuselage, supporting surfaces and an empennage, the supporting surfaces mounted for folding movement rearwardly to position along opposite sides of the fuselage, respectively, and means mounted on the empennage for maintaining said supporting surfaces in folded position.

23. In an airplane including a fuselage, supporting surfaces and an empennage, the horizontally disposed empennage surfaces foldable to vertical position, the supporting surfaces foldable rearwardly along opposite sides of the fuselage to position over said empennage surfaces in folded position, respectively, and means mounted on the vertical empennage surfaces for maintaining said supporting surfaces and empennage surfaces in folded position.

24. In an airplane including a fuselage and empennage mounted thereon, the horizontally disposed empennage surfaces pivotally mouned for folding, struts extending from said surfaces to the fuselage in normal extended position of said surfaces, said struts pivotally mounted on the fuselage and swingable to position on the sides of the fuselage with the empennage surfaces in folded position, and locking means mounted on the vertical empennage surfaces for engaging and maintaining the horizontal empennage surfaces in folded position.

25. In an airplane, a fuselage, a supporting surface pivotally mounted at the root thereof to said fuselage, an aileron control rod mounted in said supporting surface and extending through the root thereof, aileron operating means mounted in the fuselage and extending therethrough in line with said control rod in normal position of said supporting surface, and means detachably connecting said aileron control rod with said operating means between said fuselage and the root of said supporting surface.

26. In an airplane, a fuselage, and a supporting surface detachably mounted at its root end to said fuselage, an aileron control rod mounted in said supporting surface and extending through the root thereof, aileron operating means mounted in said fuselage, and said aileron control rod detachably connected at the root end of said supporting surface with said operating means.

27. In an airplane, a fuselage, a normally laterally extending supporting surface pivotally mounted thereon and swingable to folded substantially vertical position therealong, and a substantially rigid strut connected with and bracing said supporting surface, the said strut pivotally mounted and swingable with said supporting surface from and to normal position.

28. In an airplane, a fuselage, a normally laterally extending supporting surface pivotally mounted on said fuselage for rotation on a longitudinal axis and for swinging movement on a substantially vertical axis and a strut extending outwardly to and bracing the lateral portion of said supporting surface, the said supporting surface, pivotally mounted on said strut for rotation around a longitudinal axis, and the said supporting surface and strut swingable as a unit to and from normal position.

29. A hinge for foldably mounting a supporting surface on an airplane, comprising members extending at an angle to each other, each of said members having a collar intermediate the length thereof, a locking sleeve loosely confined on each of said members by said collars, respectively, and the said sleeves adapted to extend over the outer portions of said members, concentric therewith and spaced therefrom, respectively.

30. A hinge for foldably mounting a supporting surface on an airplane, comprising members extending at an angle to each other, each of said members provided with a locking sleeve loosely confined thereon, and means for locking said sleeves.

31. In an airplane including a fuselage, supporting surfaces and an empennage, the horizontally disposed empennage surfaces foldable to substantially vertical position, the supporting surfaces foldable rearwardly along opposite sides of the fuselage to position over said empennage surfaces in folded position, respectively, a member extending transversely of and laterally from opposite sides of the vertical empennage surfaces for receiving and confining said foldable empennage surfaces and supporting surfaces in folded position, and means mounted on said member for locking said surfaces in folded position.

32. In an airplane, the lateral empennage surfaces foldable to vertical position, the supporting surfaces foldable rearwardly to position along opposite sides of the fuselage extending over said lateral empennage surfaces in folded position, and means engaging and supporting said supporting surfaces and lateral empennage surfaces in folded position.

33. In an airplane, an empennage, and supporting surfaces foldable rearwardly to position along opposite sides of the empennage, the supporting surfaces supported in folded position from the empennage.

34. In an airplane, the combination with a fuselage having a hinge member extending laterally therefrom, of a supporting surface formed with a hollow longitudinal beam at the root end rotatably mounted on said hinge member, and a locking sleeve on said hinge member adapted to fit over and couple said beam to the hinge member.

35. In an airplane, a fuselage having a frame including as an element thereof a hollow compression member, a supporting surface including a hollow beam therefor, and a hinge for foldably mounting the supporting surface to the fuselage, said hinge comprising a member adapted to rotatably fit into said hollow compression member and a member adapted to fit into the root end of said hollow supporting surface beam, and means on said hinge members for locking said fuselage compression member and said supporting surface beam thereto, respectively.

36. In an airplane, a fuselage having a frame including as an element thereof a compression member formed with a socket at one end, a supporting surface including a beam formed with a socket at the root end thereof, and a hinge for foldably mounting the supporting surface on the fuselage, comprising a member adapted to be rotatably mounted in the fuselage compression member socket and a member adapted to be mounted in the supporting surface beam socket for rotation of said beam thereon, and a locking member on each of said hinge members adapted to detachably engage the fuselage compression member and the supporting surface beam, respectively, to secure the supporting surface in position on the fuselage.

VALENTINE GEPHART.